United States Patent
Ozawa et al.

(10) Patent No.: US 8,779,028 B2
(45) Date of Patent: Jul. 15, 2014

(54) INK FOR INK-JET RECORDING APPARATUS

(75) Inventors: Noriaki Ozawa, Osaka (JP); Noriaki Furukawa, Osaka (JP); Susumu Hiroshima, Osaka (JP); Yasuko Takaori, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 82 days.

(21) Appl. No.: 13/355,043

(22) Filed: Jan. 20, 2012

(65) Prior Publication Data

US 2012/0196966 A1  Aug. 2, 2012

(30) Foreign Application Priority Data

Jan. 28, 2011  (JP) .................................. 2011-017311

(51) Int. Cl.
*C09D 11/10* (2014.01)

(52) U.S. Cl.
USPC .......................................... 523/160; 524/386

(58) Field of Classification Search
USPC ........................................................ 523/160
See application file for complete search history.

(56) References Cited

U.S. PATENT DOCUMENTS

| | | | | |
|---|---|---|---|---|
| 6,613,136 B1 * | 9/2003 | Arita et al. | .................. | 106/31.58 |
| 7,442,244 B2 * | 10/2008 | Ishihara | ..................... | 106/31.58 |
| 2007/0117882 A1 * | 5/2007 | Aoyama et al. | ................ | 523/160 |
| 2009/0035468 A1 | 2/2009 | Matsuyama et al. | | |
| 2010/0118069 A1 | 5/2010 | Kayahara et al. | | |
| 2010/0222472 A1 | 9/2010 | Morimoto | | |
| 2011/0043578 A1 | 2/2011 | Tojo | | |

FOREIGN PATENT DOCUMENTS

| | | |
|---|---|---|
| JP | 2002-020664 A | 1/2002 |
| JP | 2003-268277 | 9/2003 |
| JP | 2007-119708 A | 5/2007 |
| JP | 2009-067942 A | 4/2009 |
| JP | 2009-144006 A | 7/2009 |
| JP | 2010-084086 A | 4/2010 |
| JP | 2010-106155 A | 5/2010 |
| JP | 2010-106157 A | 5/2010 |
| JP | 2010-202688 A | 9/2010 |
| WO | 2010074350 A1 | 7/2010 |
| WO | WO 2010/074350 A1 | 7/2010 |

OTHER PUBLICATIONS

European Patent Office Extended European Search Report mailed May 25, 2012 in corresponding EP Application No. 12000545.9.

* cited by examiner

*Primary Examiner* — Vu A Nguyen
(74) *Attorney, Agent, or Firm* — Frommer Lawrence & Haug LLP (57) ABSTRACT

An ink for an ink-jet recording apparatus contains at least water, a pigment dispersion, and a penetrating agent. The pigment dispersion contains a resin having a molecular weight of about 60,000 or more and about 150,000 or less. The ink for an ink-jet recording apparatus contains an alkanediol having 8 or 9 carbon atoms as the penetrating agent. The content of the alkanediol is about 0.2% by mass or more relative to the total mass of the ink.

7 Claims, 5 Drawing Sheets

INK FOR INK-JET RECORDING APPARATUS

INCORPORATION BY REFERENCE

This application is based upon and claims the benefit of priority from the corresponding Japanese Patent application No. 2011-017311, filed Jan. 28, 2011, the entire contents of which are incorporated herein by reference.

FIELD

The present disclosure relates to an ink for an ink-jet recording apparatus.

BACKGROUND

Recently, with the rapid progress in recording technologies, it has been possible to obtain high-definition image quality substantially equal to that of silver halide photography. Accordingly, ink-jet recording apparatuses that form images by an ink-jet recording system have been widely used as image forming apparatuses.

For such ink-jet recording apparatuses, realization of high-speed image formation has been strongly desired. However, in the case where image formation is performed in an ink-jet recording apparatus at a high speed, before an ink permeates into a recording medium such as a paper, the recording medium passes through a pair of discharge rollers and is discharged, and consequently, the ink may adhere to the discharge roller (offset). In this case, an image defect tends to be generated in a formed image. In order to suppress generation of an image defect in a formed image due to offset, it is conceivable that the amount of ink to be ejected is reduced. In this case, it is difficult to form an image having a desired image density.

In view of the above circumstances, for example, an ink for an ink jet recording apparatus, the ink containing 2-n-butyl-2-ethyl-1,3-propanediol and a pigment dispersion prepared by using a resin having a weight-average molecular weight of 3,000 or more and 50,000 or less, has been proposed as an ink in which problems regarding the generation of an image defect in a formed image due to offset and the image density of a formed image are solved.

However, a further increase in the speed of image formation has been desired for ink-jet recording apparatuses. In this case, with the above-proposed ink for an ink-jet recording apparatus, above-mentioned problems regarding the generation of an image defect in a formed image due to offset and the image density of a formed image is not necessarily solved.

In the case where an ink-jet recording apparatus using a line-head recording system (hereinafter also referred to as a "line-head-type ink-jet recording apparatus") is used, with the ink-jet recording apparatus being capable of forming an image at a high speed, unlike a serial-type ink jet recording apparatus, overwriting of an image cannot be performed. Therefore, in order to form an image having a desired image density, it is necessary to increase the amount of ink ejected, as compared with the case where a serial-type ink-jet recording apparatus is used. Accordingly, in the case where such a line-head-type ink-jet recording apparatus is used, an image defect in a formed image due to offset tends to be particularly generated. Thus, in a line-head-type ink-jet recording apparatus, it is very difficult to achieve both the suppression of generation of an image defect in a formed image due to offset and the formation of an image having a desired image density by using the above-proposed ink for an ink-jet recording apparatus.

SUMMARY

Some embodiments of the present disclosure relate to an ink for an ink-jet recording apparatus, in which generation of an image defect in a formed image due to offset can be suppressed.

An ink for an ink-jet recording apparatus according to an aspect of some embodiments of the present disclosure contains at least water, a pigment dispersion, and a penetrating agent. The pigment dispersion contains a resin having a molecular weight of about 60,000 or more and about 150,000 or less and a pigment. The penetrating agent contains an alkanediol having 8 or 9 carbon atoms. The content of the alkanediol is about 0.2% by mass or more relative to the total mass of the ink.

The above and other objects, features, and advantages of various embodiments of the present disclosure will be more apparent from the following detailed description of embodiments taken in conjunction with the accompanying drawings.

Throughout the specification and claims, the following terms take at least the meanings explicitly associated herein, unless the context dictates otherwise. The meanings identified below do not necessarily limit the terms, but merely provide illustrative examples for the terms. In the text, the terms "comprising", "comprise", "comprises" and other forms of "comprise" can have the meaning ascribed to these terms in U.S. Patent Law and can mean "including", "include", "includes" and other forms of "include." The term "contains" or other fours thereof, as used herein, is synonymous with "comprises" or "includes"; it is similarly inclusive or open-ended and does not exclude additional, unrecited elements or steps. The term "composed" or other forms thereof, as used herein, denotes that some embodiments or implementations may exclude unspecified materials, compounds, elements, components, or the like (e.g., other than, for example, impurities, trace compounds, or the like), and that some embodiments may not exclude other unspecified materials, compounds, elements, components, or the like; for example, other unspecified materials, compounds, elements, may be included provided they do not adversely affect the desired characteristics of the specified material, compound, element, component, or the like, or otherwise do not materially alter the basic and novel characteristics of the embodiment or implementation. The phrase "an embodiment" as used herein does not necessarily refer to the same embodiment, though it may. In addition, the meaning of "a," "an," and "the" include plural references; thus, for example, "an embodiment" is not limited to a single embodiment but refers to one or more embodiments. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise.

It will be appreciated by those skilled in the art that the foregoing brief description and the following detailed description are exemplary (i.e., illustrative) and explanatory of the subject matter of the present disclosure, but are not intended to be restrictive thereof or limiting of the advantages which can be achieved by the present disclosure in various implementations. Additionally, it is understood that the foregoing summary and ensuing detailed description are representative of some embodiments of the present disclosure, and are neither representative nor inclusive of all subject matter and embodiments within the scope of the present disclosure. Thus, the accompanying drawings, referred to herein and constituting a part hereof, illustrate embodiments of this disclosure, and, together with the detailed description, serve to explain principles of embodiments of the present disclosure.

Various features of novelty which characterize various aspects of the disclosure are pointed out in particularity in the claims annexed to and forming a part of this disclosure. For a better understanding of the disclosure, operating advantages and specific objects that may be attained by some of its uses, reference is made to the accompanying descriptive matter in which exemplary embodiments of the disclosure are illustrated in the accompanying drawings in which corresponding components are identified by the same reference numerals.

BRIEF DESCRIPTION OF THE DRAWINGS

The following detailed description, given by way of example, but not intended to limit the disclosure solely to the specific embodiments described, may best be understood in conjunction with the accompanying drawings, in which.

DETAILED DESCRIPTION OF EMBODIMENTS

Reference will now be made in detail to various embodiments of the disclosure, one or more examples of which are illustrated in the accompanying drawings. Each example is provided by way of explanation of the disclosure, and by no way limiting the present disclosure. In fact, it will be apparent to those skilled in the art that various modifications, combinations, additions, deletions and variations can be made in the present disclosure without departing from the scope of the present disclosure. For instance, features illustrated or described as part of one embodiment can be used in another embodiment to yield a still further embodiment. It is intended that the present disclosure covers such modifications, combinations, additions, deletions, applications and variations that come within the scope of the appended claims and their equivalents.

Embodiments of the present disclosure will now be described in detail. However, the present disclosure is not limited to the embodiments described below, and can be carried out by appropriately adding modifications within the scope of the object of the present disclosure. Note that although a description may be omitted in overlapped portions, the gist of the disclosure is not limited. Additionally, specified numerical values (e.g., presented with respect to various parameters, limits, ranges, etc., associated with various compounds, materials, features, etc.) will be understood as being approximate (regardless of whether express terms of approximation, such as "approximately" or "about" are used) at least insofar as the literal scope and meaning of these values will be understood as not being strictly limited or equal to the stated values but should also include, for example, measurement error, nominal or typical variations, deviations from the specified values that do not result in a substantially degraded characteristic of the compound, material, feature, etc., with respect to an embodiment of the present disclosure.

An ink for an ink jet recording apparatus (hereinafter also simply referred to as an "ink") according to embodiments of the present disclosure essentially contains water, a pigment dispersion containing a resin having a specific molecular weight, and a penetrating agent containing an alkanediol having 8 or 9 carbon atoms, wherein the content of the alkanediol is about 0.2% by mass or more relative to the total mass of the ink. The ink for an ink-jet recording apparatus of the present illustrative embodiment may further contain at least one liquid component other than the penetrating agent, the at least one liquid component being selected from the group consisting of a dissolution stabilizer that stabilizes the dissolution state of components contained in the ink and a humectant that suppresses volatilization of a liquid component from the ink to stabilize the viscosity of the ink. A description will be sequentially made of water, a pigment dispersion, a penetrating agent, and liquid components other than the penetrating agent, which are essential components or optional components contained in the ink for an ink-jet recording apparatus according to some embodiments of the present disclosure, a method for producing an ink for an ink jet recording apparatus, and a method for forming an image.

The ink for an ink-jet recording apparatus of some embodiments of the present disclosure is a water-based ink, and essentially contains water. The water contained in the ink is not particularly limited as long as a desired characteristic of an ink according to an embodiment of present disclosure is achieved or not substantially impaired. Water having a desired purity can be appropriately selected from various types of water which have been hitherto used in producing a water-based ink, and used. The content of water in the ink for an ink-jet recording apparatus of the present disclosure is not particularly limited as long as a desired characteristic of an ink according to an embodiment of present disclosure is achieved or not substantially impaired. The content of water is appropriately changed in accordance with the amounts of other components described below. A typical content of water in the ink is preferably about 20% by mass or more and about 70% by mass or less, and more preferably about 25% by mass or more and about 60% by mass or less relative to the total mass of the ink.

The ink for an ink jet recording apparatus of some embodiments of the present disclosure essentially contains a pigment dispersion containing a pigment, which is a coloring agent. The pigment that can be incorporated in the pigment dispersion is not particularly limited as long as a desired characteristic of an ink according to an embodiment of present disclosure is achieved or not substantially impaired. The pigment can be appropriately selected from pigments which have been hitherto used as a coloring agent of an ink for an ink-jet recording apparatus, and used. Specific examples of the pigment which may be preferable in some embodiments include yellow pigments such as C. I. Pigment Yellows 74, 93, 95, 109, 110, 120, 128, 138, 139, 151, 154, 155, 173, 180, 185, and 193; orange pigments such as C. I. Pigment Oranges 34, 36, 43, 61, 63, and 71; red pigments such as C. I. Pigment Reds 122 and 202; blue pigments such as C. I. Pigment Blue 15; violet pigments such as C. I. Pigment Violets 19, 23, and 33; and black pigments such as C. I. Pigment Black 7.

The pigment dispersion contained in the ink for an ink-jet recording apparatus of some embodiments of the present disclosure contains a resin having a molecular weight of about 60,000 or more and about 150,000 or less. The molecular weight of the resin contained in the pigment dispersion is a weight-average molecular weight (Mw). The molecular weight of the resin can be measured, for example, using a gel permeation chromatography system as a measuring apparatus. In the case where the molecular weight of the resin is excessively low, when an image is formed on a recording medium, it is difficult to obtain an image having a desired image density. In the case where the molecular weight is excessively high, the ink has a high viscosity. Accordingly, ejection failure of the ink from a nozzle tends to be caused by a further increase in the viscosity of the ink when a solvent in the ink volatilizes. Thus, in the case where the molecular weight of the resin is excessively high, a satisfactory image is not easily formed.

A method for producing the pigment dispersion containing a pigment and a resin is not particularly limited as long as a desired characteristic of an ink according to an embodiment of present disclosure is achieved or not substantially impaired, and can be appropriately selected from known methods. An example of a method that may be preferable in some embodiments is a method in which a pigment and a resin are kneaded in an appropriate liquid medium such as water using a media-type wet dispersing device such as a Nano Grain Mill (manufactured by Asada Iron Works Co., Ltd.), an MSC Mill (manufactured by Nippon Coke & Engineering Co., Ltd.), or a DYNO-Mill (manufactured by Shinmaru Enterprises Corporation) to prepare a pigment dispersion. In the process with the media-type wet dispersing device, beads having a small particle diameter are used. The particle diameter of the beads is not particularly limited, but is typically about 0.5 mm or more and about 1.0 mm or less. The material of the beads is also not particularly limited, but beads composed of a hard material, such as zirconia, are preferably used in some embodiments.

In producing the pigment dispersion, the amount of liquid medium used is not particularly limited as long as the pigment and the resin can be satisfactorily kneaded. Typically, in some embodiments, the liquid medium is used in an amount of preferably 1 time or more and 10 times or less, more preferably 2 times or more and 8 times or less, of the total mass of the pigment and the resin.

In some embodiments, the volume-average particle diameter of the pigment contained in the pigment dispersion is preferably about 50 nm or more and about 200 nm or less, and more preferably about 70 nm or more and about 130 nm or less, from the standpoint of the color density and hue of the ink, the stability of the ink, etc. The volume-average particle diameter of the pigment can be adjusted by changing the particle diameter of the beads or the processing time when the pigment and the resin are kneaded. When the volume-average particle diameter of the pigment is excessively small, the image density of a formed image may be lower than a preferable value. When the volume-average particle diameter of the pigment is excessively large, clogging of a nozzle for ejecting the ink may occur or an ejection performance of the ink may be degraded. For example, the volume-average particle diameter of the pigment can be measured with a dynamic light scattering particle size distribution analyzer (manufactured by Sysmex Corporation) or the like using a sample prepared by diluting a pigment dispersion by 300-fold with ion-exchange water.

The resin contained in the pigment dispersion is not particularly limited as long as the resin has a predetermined molecular weight. The resin can be appropriately selected from various resins which have been hitherto used in producing a pigment dispersion, and used. Specific examples of the resin which may be preferable in some embodiments include styrene-acrylic acid-alkyl acrylate copolymers, styrene-methacrylic acid-alkyl methacrylate-alkyl acrylate copolymers, styrene-acrylic acid copolymers, styrene-maleic acid copolymers, styrene-maleic acid-alkyl acrylate copolymers, styrene-methacrylic acid copolymers, styrene-alkyl methacrylate copolymers, styrene-maleic acid half ester copolymers, vinylnaphthalene-acrylic acid copolymers, and vinylnaphthalene-maleic acid copolymers. Among these resins, styrene-acrylic resins containing a unit derived from styrene and a unit derived from acrylic acid, methacrylic acid, an acrylate, or a methacrylate, such as styrene-acrylic acid-alkyl acrylate copolymers, styrene-methacrylic acid-alkyl methacrylate-alkyl acrylate copolymers, styrene-acrylic acid copolymers, styrene-maleic acid-alkyl acrylate copolymers, styrene-methacrylic acid copolymers, and styrene-alkyl methacrylate copolymers are preferable in some embodiments because these resins can be easily prepared and are excellent in terms of dispersion effect of a pigment. Each of the above resins may be obtained by radical polymerization. The molecular weight of the resin can be adjusted by a known method in which the amount of polymerization initiator used, the polymerization temperature, the polymerization time, or the like is adjusted.

The amount of pigment used is not particularly limited as long as a desired characteristic of an ink according to an embodiment of present disclosure is achieved or not substantially impaired. Specifically, in some embodiments, the pigment is preferably used in an amount of about 4% by mass or more and about 8% by mass or less relative to the total mass of the ink. When the amount of pigment used is excessively small, it is difficult to obtain an image having a desired image density. When the amount of pigment used is excessively large, since the fluidity of the ink is decreased, a satisfactory image may not be easily formed, or since permeability of the ink into a recording medium is decreased, an image defect due to offset may be easily generated on a formed image.

The ink for an ink-jet recording apparatus of some embodiments of the present disclosure contains a penetrating agent as a component that enhances permeability of the ink into a recording medium. In some embodiments, the penetrating agent contains an alkanediol having 8 or 9 carbon atoms, and the content of the alkanediol is about 0.2% by mass or more relative to the total mass of the ink. By incorporating an alkanediol having 8 or 9 carbon atoms in the ink so that the content of the alkanediol is about 0.2% by mass or more relative to the total mass of the ink, it is possible to significantly improve permeability of the ink into a recording medium and to suppress generation of an image defect in a formed image due to offset.

The alkanediol is not particularly limited and may have a straight chain or a branched chain as long as the number of carbon atoms of the alkanediol is 8 or 9. From the standpoint of significantly improving permeability, the alkanediol is more preferably a 1,2-alkanediol or a 1,3-alkanediol. Specific examples of the alkanediol include 2,5-dimethyl-2,5-hexanediol, 2-ethyl-1,3-hexanediol, 2-butyl-2-ethyl-1,3-propanediol, and 1,2-octanediol. Among these alkanediols, from the standpoint of improving permeability, 2-ethyl-1,3-hexanediol, 2-butyl-2-ethyl-1,3-propanediol, and 1,2-octanediol are preferable. These alkanediols may be used in combination of two or more alkanediols.

The content of the alkanediol in the ink is about 0.2% by mass or more, and in some embodiments is more preferably about 0.2% by mass or more and about 2.0% by mass or less, and particularly preferably about 0.2% by mass or more and about 1.0% by mass or less. When the content of the alkanediol is excessively small, the effect of suppressing generation of an image defect in a formed image due to offset may not be easily obtained. When the content of the alkanediol is excessively large, an image having a desired image density may not be easily formed.

Regarding the penetrating agent used in some embodiments of the present disclosure, an alkanediol having 8 or 9 carbon atoms can be used in combination with various organic solvents which have been hitherto used for the purpose of improving permeability of an ink for an ink jet recording apparatus as long as a desired characteristic of an ink according to an embodiment of present disclosure is achieved or not substantially impaired. Specific examples of the organic solvents that can be used in combination with the alkanediol having 8 or 9 carbon atoms include alkanediols having 7 or less carbon atoms, such as 1,2-hexylene glycol; alkylene glycol monoalkyl ethers; dialkylene glycol monoalkyl ethers; trialkylene glycol monoalkyl ethers; and cyclic ketone compounds. In the case where the alkanediol having 8 or 9 carbon atoms is used in combination with another penetrating agent, in some embodiments the total amount of penetrating agents used is about 0.2% by mass or more, preferably about 1% by mass or more and about 20% by mass or less, and more preferably about 5% by mass or more and about 15% by mass or less relative to the total mass of the ink.

According to some embodiments, the ink for an ink-jet recording apparatus of the present disclosure may contain a liquid component other than the penetrating agent. That is, besides the penetrating agent, at least one component selected from the group consisting of a dissolution stabilizer that stabilizes the dissolution state of components contained in the ink and a humectant that suppresses volatilization of a liquid component from the ink to stabilize the viscosity of the ink may be contained in the ink.

The dissolution stabilizer is a component that makes the components contained in the ink compatible with each other to stabilize the dissolution state of the ink. Specific examples of the dissolution stabilizer include 2-pyrrolidone, N-methyl-2-pyrrolidone, and γ-butyrolactone. These dissolution stabilizers may be used in combination of two or more dissolution stabilizers. In the case where the ink contains a dissolution stabilizer, the content of the dissolution stabilizer is preferably about 1% by mass or more and about 20% by mass or less, and more preferably about 5% by mass or more and about 15% by mass or less relative to the total mass of the ink.

The humectant is a component that suppresses volatilization of a liquid component from the ink to stabilize the viscosity of the ink. Specific examples of the humectant include polyalkylene glycols such as polyethylene glycol and propylene glycol; alkylene glycols such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, and 1,5-pentanediol; and glycerol. Among these humectants, glycerol is more preferable from the standpoint of achieving an excellent effect of suppressing volatilization of a liquid component such as water. These humectants may be used in combination of two or more humectants. In the case where the ink contains a humectant, the content of the humectant is preferably about 2% by mass or more and about 30% by mass or less, and more preferably about 10% by mass or more and about 25% by mass or less relative to the total mass of the ink.

In some embodiments, among these inks containing a liquid component other than the penetrating agent, an ink containing 2-pyrrolidone as a dissolution stabilizer in an amount of about 1% by mass or more and about 20% by mass or less and glycerol as a humectant in an amount of about 2% by mass or more and about 30% by mass or less relative to the total mass of the ink is preferable. In this case, generation of an image defect in a formed image due to offset can be easily suppressed, and an image having a desired image density can be easily obtained.

An embodiment of a method for producing an ink for an ink-jet recording apparatus of the present disclosure is not particularly limited as long as a liquid component other than a penetrating agent is optionally added to water, a pigment dispersion, and the penetrating agent, and these ink components can then be homogeneously mixed. A specific illustrative example of the method for producing an ink for an ink-jet recording apparatus is a method in which components of the ink are homogeneously mixed with a mixer, and foreign substances and coarse particles are then removed with a filter having a pore diameter of about 10 µm or less. In producing an ink for an ink-jet recording apparatus, various additives that have hitherto been added to an ink for an ink-jet recording apparatus, for example, liquid components other than the penetrating agent, such as a dissolution stabilizer and a humectant, a surfactant, an antioxidant, a viscosity adjusting agent, a pH adjusting agent, and an antiseptic fungicide may be added to water, the pigment dispersion, and the penetrating agent, as required.

An embodiment of an image forming apparatus used in forming an image with an ink for an ink-jet recording apparatus of the present disclosure is not particularly limited as long as the image forming apparatus is an ink-jet recording apparatus. The recording system of the image forming apparatus may be a serial system in which recording is performed while a recording head scans on a recording medium or a line-head system in which recording is performed by a recording head fixed to an apparatus main body.

Out of these recording systems, the line-head system is preferable from the standpoint of high-speed image formation. In the case where an ink jet recording apparatus using a line-head recording system (i.e., a line-head-type ink jet recording apparatus) is used, overwriting of an image cannot be performed. Therefore, in order to form an image having a desired image density, it is necessary to increase the amount of ink ejected. In this case, problems of the generation of an image defect in a formed image due to offset and strike-through and bleeding of an image particularly tend to occur. However, by using the ink according to an embodiment of the present disclosure, it is possible to achieve both the suppression of generation of an image defect in a formed image due to offset and the formation of an image having a desired image density. Furthermore, according to the ink of an embodiment of the present disclosure, by increasing the concentration of the pigment in the ink, an image having a desired image density can be formed while the amount of ink ejected is reduced. Accordingly, even when a line-head-type ink-jet recording apparatus is used, generation of strike-through and bleeding in a formed image can be easily suppressed.

Figure 1:
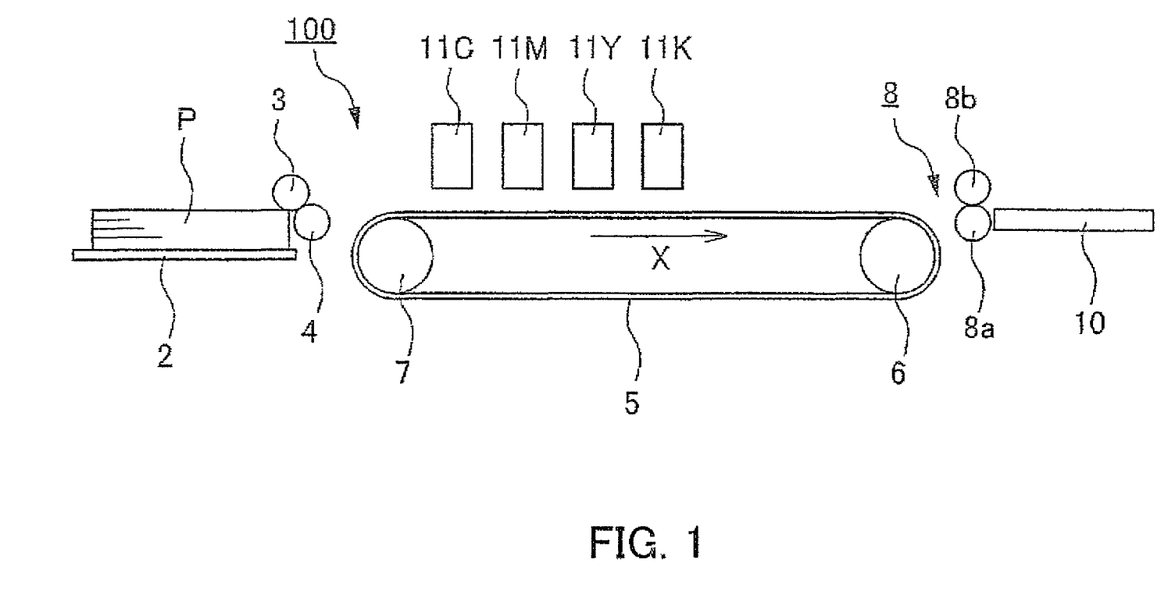
FIG. 1 is a cross-sectional side view illustrating a schematic structure of a line-head-type ink-jet recording apparatus.
Figure 2:
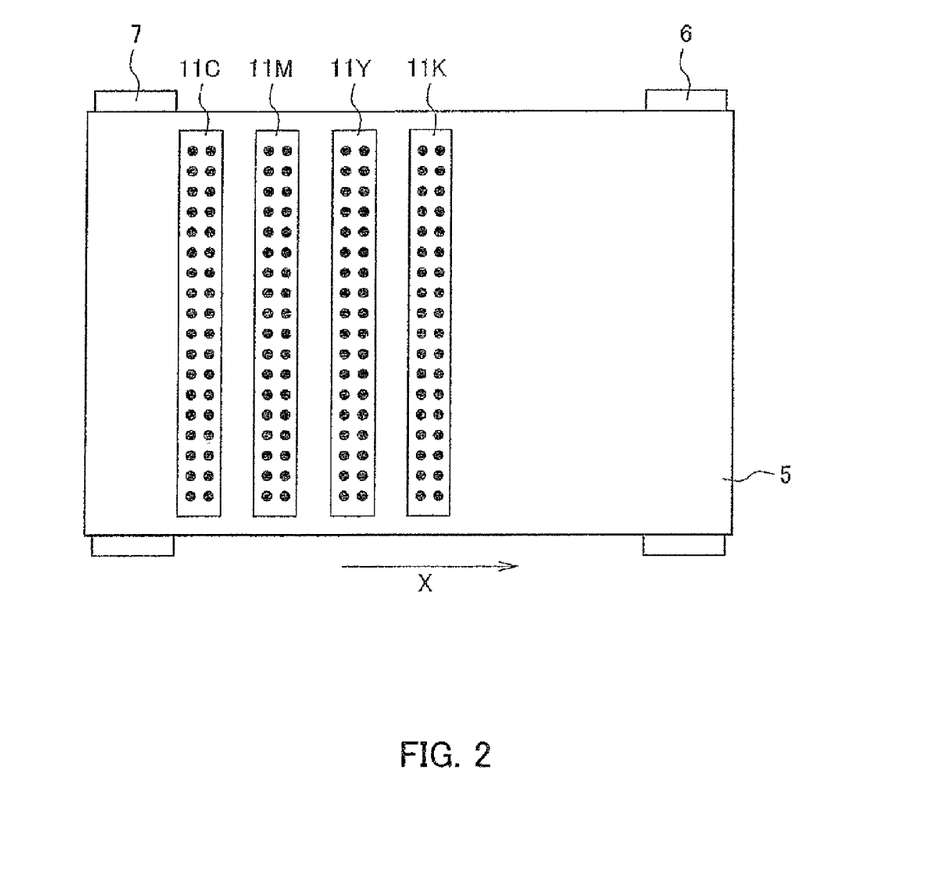
FIG. 2 is a plan view of a transporting belt of the ink-jet recording apparatus illustrated in FIG. 1, viewed from above.

A method for forming an image using an ink according to an embodiment of the present disclosure will now be described with reference to the drawings. In this embodiment, by way of example, a description will be made of a case where a line-head-type ink-jet recording apparatus is used, and a recording sheet is used as a recording medium. FIG. 1 is a cross-sectional side view illustrating a schematic structure of a line-head-type ink-jet recording apparatus according to an illustrative embodiment. FIG. 2 is a plan view of a transporting belt of the ink-jet recording apparatus illustrated in FIG. 1, viewed from above.

As illustrated in FIG. 1, a paper feed tray 2 that accommodates recording sheets P is provided on the left side of an ink-jet recording apparatus 100. A paper feed roller 3 and a driven roller 4 are provided at an end of the paper feed tray 2.

The paper feed roller 3 transports the recording sheets P accommodated in the paper feed tray 2 sequentially from the top of the bundle of the recording sheet P one by one to a transporting belt 5 described below. The driven roller 4 is in pressure contact with the paper feed roller 3 and rotates together with the paper feed roller 3.

The transporting belt 5 is capable of rotation and arranged on the downstream side (on the right side in FIG. 1) of the paper feed roller 3 and the driven roller 4 in a sheet-transporting direction. The transporting belt 5 is arranged under tension so as to surround a belt driving roller 6 that is arranged on the downstream side in the sheet-transporting direction and a belt roller 7 that is arranged on the upstream side and that rotates together with the belt driving roller 6 via the transporting belt 5. By driving the belt driving roller 6 so as to rotate in the clockwise direction, the recording sheet P is transported in the direction of an arrow X.

Here, since the belt driving roller 6 is arranged on the downstream side of the sheet-transporting direction X, the sheet feeding side (the upper side in FIG. 1) of the transporting belt 5 is pulled by the belt driving roller 6. Thus, the belt can be stretched without slack, and the recording sheet P can be stably transported. A sheet composed of a dielectric resin is used as the transporting belt 5. Regarding the shape of the transporting belt 5, a belt having no seam (seamless belt) is used.

A discharge roller 8a and a driven roller 8b are provided on the downstream side of the transporting belt 5 in the sheet-transporting direction. The discharge roller 8a is driven in the clockwise direction in the figure to discharge the recording sheet P, on which an image has been recorded, to the outside of an apparatus main body. The driven roller 8b pressure contacts with the discharge roller 8a from the upper side and rotates together with the discharge roller 8a. A paper discharge tray 10, on which the recording sheets P discharged to the outside of the apparatus main body are stacked, is provided on the downstream side of the discharge roller 8a and the driven roller 8b in the sheet-transporting direction.

Since the driven roller 8b directly contacts with an image surface, the material forming the surface of the driven roller 8b is preferably a water-repellent material. By forming the surface of the driven roller 8b using a water-repellent material, it is possible to suppress adhesion of an ink that has not yet permeated into the recording sheet P to the driven roller 8b, and thus to easily suppress generation of an image defect in a formed image due to offset. Examples of the preferable water-repellent material include fluorocarbon resins such as polytetrafluoroethylene (PTFE), tetrafluoroethylene-perfluoroalkylvinyl ether copolymers, tetrafluoroethylene-hexafluoropropylene copolymers, tetrafluoroethylene-ethylene copolymers, tetrafluoroethylene-vinylidene fluoride copolymers, tetrafluoroethylene-hexafluoropropylene-perfluoroalkylvinyl ether copolymers, polychlorotrifluoroethylene, chlorotrifluoroethylene-ethylene copolymers, chlorotrifluoroethylene-vinylidene fluoride copolymers, polyvinylidene fluoride, and polyvinyl fluoride. As in the driven roller 8b, the surface of a member that contacts with an image surface is preferably composed of a water-repellent material.

Furthermore, line heads 11C, 11M, 11Y, and 11K are arranged above the transporting belt 5. The line heads 11C, 11M, 11Y, and 11K are supported at a height so as to form a predetermined gap with respect to the upper surface of the transporting belt 5, and perform recording of an image on the recording sheet P transported on the transporting belt 5. These line heads 11C, 11M, 11Y, and 11K are filled with colored inks having four different colors (cyan, magenta, yellow, and black), respectively. The colored inks are respectively ejected from the line heads 11C to 11K, thereby forming a color image on the recording sheet P.

From the standpoint of a reduction in the size of the apparatus, the time required from landing of an ink droplet ejected from each of the line heads 11C to 11K on the recording sheet P to arrival of the landing position of the ink droplet on the recording sheet P at a discharge portion 8, which is composed of the discharge roller 8a and the driven roller 8b and which discharges the recording sheet P, is preferably about one second or less according to some embodiments. Even in the case where this time is set to about one second or less, the effect of suppressing generation of an image defect in a formed image due to offset at the time of high-speed image formation can be sufficiently obtained by using the ink according to an embodiment of the present disclosure.

The volume of one droplet of at least one ink or a plurality of inks having respective colors and ejected from the line heads 11C to 11K onto the recording sheet P is not particularly limited. An image is formed while adjusting the volume of one droplet of the ink so that an image having a desired image density can be formed and an image defect in a formed image due to offset is not easily generated.

As illustrated in FIG. 2, each of the line heads 11C to 11K includes nozzle rows, each of which includes a plurality of nozzles arranged in a direction (up-and-down direction in FIG. 2) orthogonal to the transporting direction of the recording sheet P. The line heads 11C to 11K have a recording area equal to or larger than the width of the recording sheet P transported, and can record an image corresponding to one line at one time on the recording sheet P transported on the transporting belt 5.

The line-head-type ink-jet recording apparatus of this embodiment includes line heads each configured to have a recording area equal to or larger than the width of the recording sheet P by arranging a plurality of nozzles in the longitudinal direction of a long head main body having a length equal to or larger than the width of the transporting belt 5. Alternatively, for example, it is also possible to use line heads configured so that an image can be recorded over the entire width of the recording sheet P transported, by arranging, in the width direction of the transporting belt 5, a plurality of short head units each including a plurality of nozzles.

As for an ejection system of an ink of each of the line heads 11C to 11K, it is possible to use various systems such as a piezoelectric element system in which an ink droplet is ejected by utilizing a pressure generated in an ink chamber of each of the line heads 11C to 11K using a piezoelectric element (piezo element) (not shown), and a thermal ink-jet system in which an air bubble is generated by a heating element to apply a pressure, thereby ejecting an ink. In various implementations, the ejection system of an ink is preferably the piezoelectric element system because the amount of ink ejected can be easily controlled.

Figure 3:
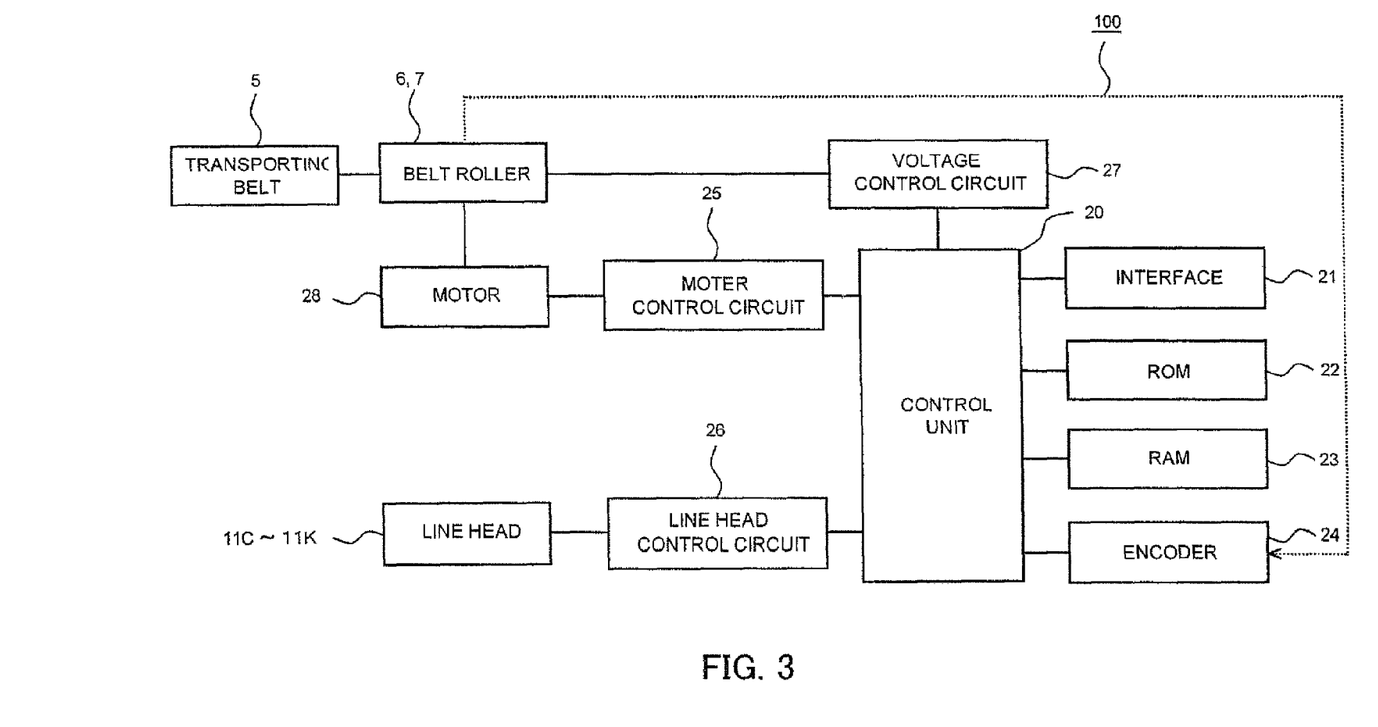
FIG. 3 is a block diagram illustrating a structure of the line-head-type ink jet recording apparatus.

FIG. 3 is a block diagram illustrating a structure of the line-head-type ink-jet recording apparatus. Parts common to those in FIGS. 1 and 2 are assigned the same reference numerals, and a description of those parts is omitted. The ink-jet recording apparatus 100 includes a control unit 20. An interface 21, a ROM 22, a RAM 23, an encoder 24, a motor control circuit 25, a line head control circuit 26, a voltage control circuit 27, etc. are connected to the control unit 20.

The interface 21 performs, for example, transmission and reception of data with a host unit (not shown) such as a personal computer. The control unit 20 converts an image signal received through the interface 21 to image data by performing variable-magnification processing or gradation processing as required. The control unit 20 then outputs control signals to various control circuits described below.

The ROM 22 stores a control program and the like used when image recording is performed by driving line heads 11C to 11K. The RAM 23 stores the image data subjected to the variable-magnification processing or the gradation processing by the control unit 20 in a predetermined region.

The encoder 24 is connected to the belt driving roller 6 that drives the transporting belt 5, and outputs a pulse train in accordance with the amount of rotational displacement of a rotating shaft of the belt driving roller 6. The control unit 20 calculates the amount of rotation by counting the number of pulses transmitted from the encoder 24 to grasp the amount of feed of a recording sheet P (sheet position). The control unit 20 outputs control signals to the motor control circuit 25 and the line head control circuit 26 on the basis of signals from the encoder 24.

The motor control circuit 25 drives a motor 28 for transporting a recording medium on the basis of the output signal from the control unit 20. The belt driving roller 6 is rotated by driving the motor 28 for transporting a recording medium. When the belt driving roller 6 rotates, the transporting belt 5 is thereby rotated in the clockwise direction in FIG. 1 to transport the recording sheet P in the direction shown by the arrow X.

The line head control circuit 26 forwards the image data stored in the RAM 23 to the line heads 11C to 11K on the basis of the output signal from the control unit 20, and controls ejection of inks from the line heads 11C to 11K on the basis of the forwarded image data. Recording processing on the recording sheet P is performed by this control and a control of the transportation of the recording sheet P by the transporting belt 5 driven by the motor 28 for transporting a recording medium.

The voltage control circuit 27 applies a voltage to a belt roller 7 provided on the paper feed side on the basis of an output signal from the control unit 20 to generate an alternating electric field, and allows the recording sheet P to be electrostatically absorbed to the transporting belt 5. Release of the electrostatic absorption is performed by grounding the belt roller 7 or the belt driving roller 6 on the basis of an output signal from the control unit 20. In this embodiment, a voltage is applied to the belt roller 7 provided on the paper feed side. Alternatively, a voltage may be applied to the belt driving roller 6 provided on the paper discharge side.

Figure 4:
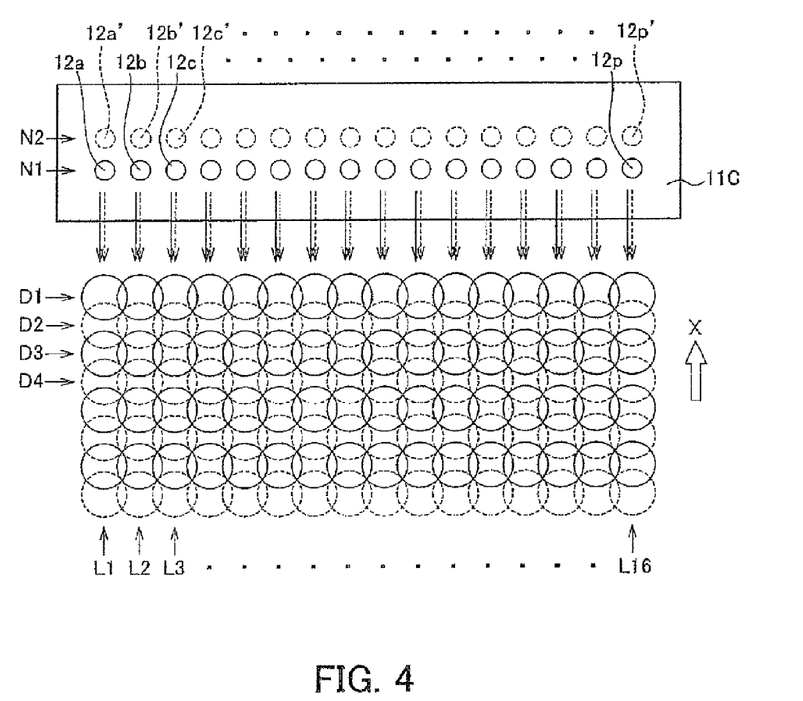
FIG. 4 is an enlarged plan view illustrating a line head used in the line-head-type ink-jet recording apparatus and a part of dot rows formed on a recording sheet.

A method for forming dots using the line-head-type ink-jet recording apparatus will now be specifically described with reference to FIG. 4. In FIG. 4, a description will be made about, as an example, the line head 11C among the line heads 11C to 11K illustrated in FIGS. 1 and 2. However, the method for forming dots of each of the other line heads 11M to 11K is the same as that of the line head 11C.

As illustrated in FIG. 4, nozzle rows N1 and N2 each including a plurality of nozzles are arranged in parallel in the line head 11C in the transporting direction of the recording sheet P (direction shown by the arrow X). Specifically, the line head 11C includes, as nozzles for forming each dot row in the transporting direction of a recording sheet P, one nozzle in each of the nozzle rows N1 and N2 (for example, in a dot row L1, nozzles 12a and 12a'), i.e., total two nozzles. For the sake of convenience of description, among nozzles constituting the nozzle rows N1 and N2, only 16 nozzles in each of the nozzle rows, namely, nozzles 12a to 12p and nozzles 12a' to 12p' corresponding to the dot rows L1 to L16, respectively, are shown in FIG. 4. However, it is assumed that, in reality, a larger number of nozzles are arranged in a direction orthogonal to the transporting direction of the recording sheet P.

An image is formed on the recording sheet P by sequentially using these nozzle rows N1 and N2. For example, while moving the recording sheet P in the transporting direction, a dot row D1 corresponding to one line in the width direction of the recording sheet P (left-to-right direction in the figure) is formed by ejecting ink droplets from the nozzle row N1 (as shown by the solid-line arrows in the figure). Subsequently, a dot row D2 corresponding to next one line is formed by ejecting the ink droplets from the nozzle row N2 (as shown by the broken-line arrows in the figure). Furthermore, a dot row D3 corresponding to next one line is formed by ejecting the ink droplets from the nozzle row N1 again. Thereafter, a dot row D4 and subsequent dot rows are also formed in the same manner by alternately using the nozzle rows N1 and N2.

The above-described ink for an ink-jet recording apparatus of the present disclosure can achieve both suppression of generation of an image defect in a formed image due to offset and formation of an image having a desired image density. Thus, the ink according to embodiments of the present disclosure can be suitably used in ink-jet recording apparatuses using various recording systems.

EXAMPLES

Illustrative embodiments of the present disclosure will now be described more specifically by way of Examples. Note that the subject matter of the present disclosure is not limited by the Examples.

In Examples and Comparative Examples, alkanediols below were used.

Branched-chain alkanediol (C7): 2-Methyl-2-propyl-1,3-propanediol

Branched-chain alkanediol (C8): 2-Ethyl-1,3-hexanediol

Branched-chain alkanediol (C9): 2-Butyl-2-ethyl-1,3-propanediol

Straight-chain alkanediol (C8): 1,2-Octanediol

Straight-chain alkanediol (C6): 1,2-Hexanediol

Reference Example

Production of Styrene-Acrylic Resins

Styrene-acrylic resins used in preparation of pigment dispersions were produced by a macromonomer synthesis method. Specifically, Resins 1 to 6 having different molecular weights were produced by copolymerizing an oligomer (AS-6, manufactured by Toagosei Co., Ltd., number-average molecular weight (Mn): 6,000) in which a (meth)acryloyl group is bonded to a molecular end of polystyrene and comonomers selected from methacrylic acid (MA), methyl methacrylate (MMA), and butyl acrylate (BA) shown in Table 1 as constitutional monomers in methyl ethyl ketone in the presence of a polymerization initiator (2,2'-azobis(2,4-dimethylvaleronitrile)) while respectively changing the amount of polymerization initiator used, the polymerization temperature, and the polymerization time. The weight-average molecular weight (Mw) of each of the prepared resins was determined by using a gel permeation chromatography (HLC-8020GPC (manufactured by Tosoh Corporation)) under the conditions described below. The weight-average molecular weights of Resins 1 to 6 are shown in Table 1. The acid value (mgKOH/g) of each of the prepared resins was determined by titration. The acid values of Resins 1 to 6 are shown in Table 1.

<Conditions for Measurement of Weight-Average Molecular Weight>

Column: TSKgel, Super Multipore HZ-H (manufactured by Tosoh Corporation, 4.6 mm ID×15 cm)
  The number of columns: 3
  Eluent: Tetrahydrofuran
  Flow rate: 0.35 mL/min
  Amount of sample injection: 10 µL
  Measurement temperature: 40° C.
  Detector: IR detector A calibration curve was prepared by using eight types of samples, namely, F-40, F-20, F-4, F-1, A-5000, A-2500, A-1000, and n-propylbenzene selected from standard samples (TSK standard, polystyrene, manufactured by Tosoh Corporation).

TABLE 1

| | Weight-average molecular weight | Acid value (mgKOH/g) | Constitutional monomers |
|---|---|---|---|
| Resin 1 | 60,000 | 180 | Styrene/MA/MMA/BA |
| Resin 2 | 50,000 | 200 | Styrene/MA/MMA/BA |
| Resin 3 | 80,000 | 190 | Styrene/MA/MMA/BA |
| Resin 4 | 120,000 | 180 | Styrene/MA/MMA/BA |
| Resin 5 | 150,000 | 200 | Styrene/MA/MMA/BA |
| Resin 6 | 165,000 | 190 | Styrene/MA/MMA/BA |

Example 1, Example 2, and Comparative Example 1

Preparation of Pigment Dispersion

A pigment P.B-15:3 was used as a cyan pigment. To a Nano Grain Mill (manufactured by Asada Iron Works Co., Ltd.), 15% by mass of the pigment, 6% by mass of a styrene-acrylic resin (Resin 1), and 0.5% by mass of a surfactant (Olfine E1010, ethylene oxide adduct of acetylene diol, manufactured by Nissin Chemical Industry Co., Ltd.) relative to the total mass of materials used in the preparation of a pigment dispersion, water, and potassium hydroxide in an amount necessary for neutralizing the styrene-acrylic resin were charged. Zirconia beads having a bead diameter of 0.5 mm were charged as media in the Nano Grain Mill. The pigment and the styrene-acrylic resin were kneaded while being subjected to water cooling to prepare a pigment dispersion. The prepared pigment dispersion was diluted by 300-fold with ion-exchange water. The volume-average particle diameter D50 of the pigment in the diluted pigment dispersion was measured with a dynamic light scattering particle size distribution analyzer (Zetasizer Nano, manufactured by Sysmex Corporation). It was confirmed that the volume-average particle diameter of the pigment was within a range of about 70 nm or more and about 130 nm or less.

(Preparation of Ink)

Components were homogeneously mixed with a mixing device at proportions shown in Table 2, and each of the resulting mixtures was then filtered with a filter having a pore diameter of 5 µl. Thus, inks of Example 1, Example 2, and Comparative Example 1 were prepared. Note that the contents shown in Table 2 represent the contents of respective components relative to the total mass of the ink. The viscosity of each of the inks was adjusted to be 6 mPas by adjusting the amount of glycerol used.

[Evaluation of Permeability]

Figure 5:
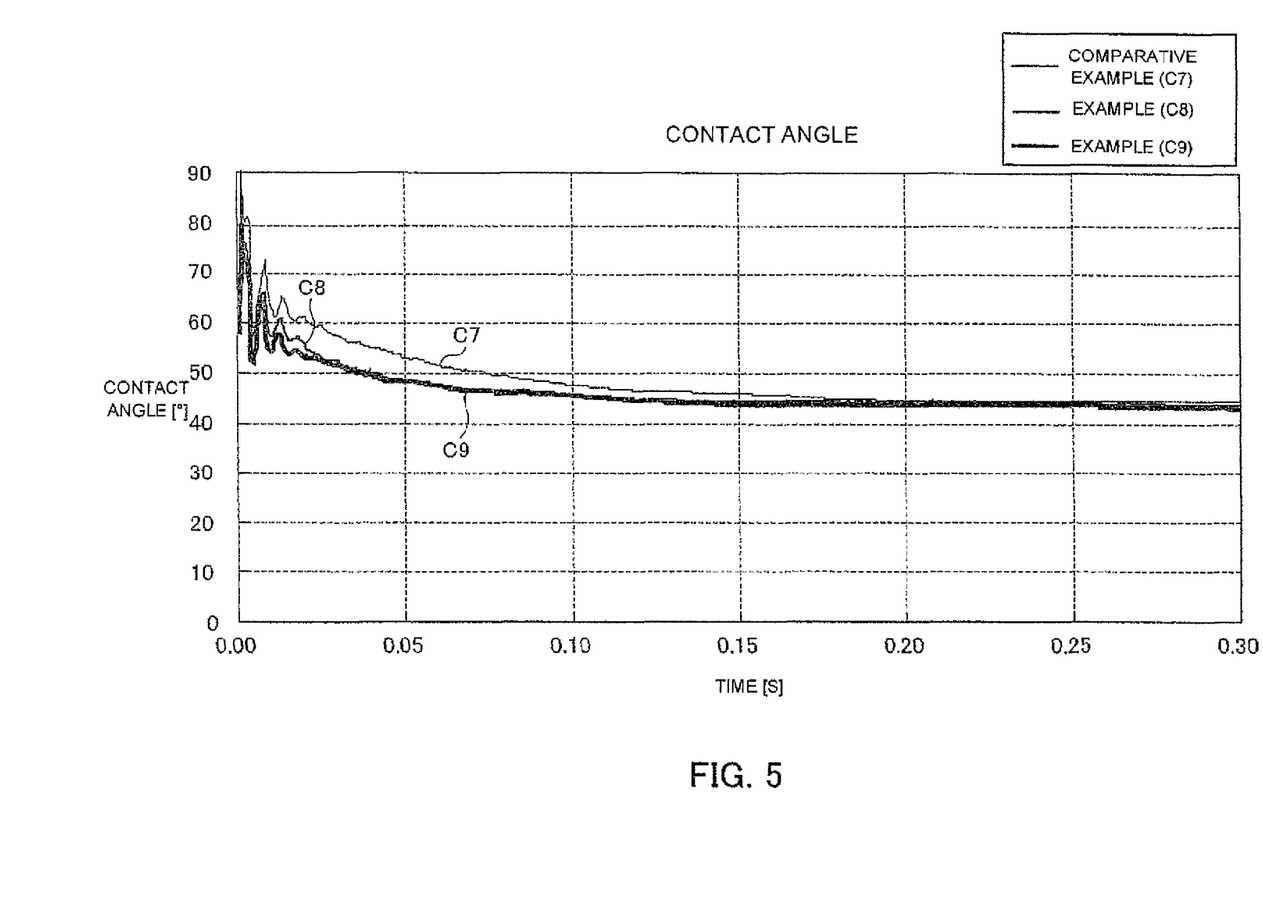
FIG. 5 is a graph showing dynamic contact angles of inks of Example 1, Example 2, and Comparative Example 1.

Permeability of an ink into paper was evaluated by measuring a dynamic contact angle of each of the inks of Example 1, Example 2, and Comparative Example 1 in accordance with the method described below. FIG. 5 shows the measurement results of the dynamic contact angles of the inks of Example 1, Example 2, and Comparative Example 1.

<Method for Measuring Dynamic Contact Angle>

The penetration behavior of an ink into paper was evaluated using a dynamic contact angle meter (OCA40, manufactured by Dataphysics Instruments GmbH). Specifically, a sample was push out from an end of a needle of a syringe to form a liquid droplet of 0.5 µL or more and 1.0 µL or less at the end of the needle. This liquid droplet was caused to adhere to a surface of a paper by a touch-off method, and a dynamic contact angle of the ink was measured. The measurement was performed after 0.05 seconds passed from landing of the liquid droplet on the surface of the paper. It is ideal that the measurement is performed at the moment of the landing of the liquid droplet on the surface of the paper. However, since reproducible measurement results are obtained after 0.05 seconds or later, the measurement was performed after 0.05 seconds passed from landing of the liquid droplet on the surface of the paper.

TABLE 2

| | Example 1 | Example 2 | Comparative Example 1 |
|---|---|---|---|
| Pigment dispersion | | | |
| Type of pigment | P.B-15:3 | P.B-15:3 | P.B-15:3 |
| Content of dispersion (mass %)[1] | 40.0 | 40.0 | 40.0 |
| Content of pigment (mass %) | 6.0 | 6.0 | 6.0 |
| Surfactant[2] | 0.5 | 0.5 | 0.5 |
| Triethylene glycol monobutyl ether (mass %) | 5.0 | 5.0 | 5.0 |
| 2-Pyrrolidone (mass %) | 5.0 | 5.0 | 5.0 |
| Branched-chain alkanediol | | | |
| The number of carbon atoms | 8 | 9 | 7 |
| Content (mass %) | 0.5 | 0.5 | 0.5 |
| Glycerol (mass %) | 25.0 | 25.0 | 25.0 |
| Ion-exchange water (mass %) | 24.0 | 24.0 | 24.0 |

[1]Content (mass %) of pigment dispersion relative to total mass of ink.
[2]Olfine E1010 (ethylene oxide adduct of acetylene diol, manufactured by Nissin Chemical Industry Co., Ltd.)

Referring to FIG. 5, the inks of Examples 1 and 2, in which a branched-chain alkanediol having 8 or 9 carbon atoms was used, have dynamic contact angles smaller than that of the ink of Comparative Example 1, in which a branched-chain alkanediol having 7 carbon atoms was used, and thus have good wettability to paper. These results show that the inks of Examples 1 and 2 have good permeability into paper as compared with the ink of Comparative Example 1.

[Evaluation of Offset Property]

An offset property of each of the inks of Example 1, Example 2, and Comparative Example 1 was evaluated in accordance with the method described below. Table 3 shows evaluation results of the offset properties of the inks of Example 1, Example 2, and Comparative Example 1.

<Method for Evaluating Offset Property>

An offset property was evaluated using a line-head-type ink-jet recording apparatus in an environment of room temperature and normal relative humidity (23° C., 60% RH). A recording head was filled with an ink, and an excessive liquid protruding from a nozzle-formed surface of the recording head was then wiped with a wiper blade. The distance between the nozzle-formed surface of the recording head and a recording sheet was set to 1 mm. The amount of ink ejected on a recording medium per color was set to 15 g/m². Ten solid images were successively formed by ejecting only a cyan ink. The offset property was evaluated by observing the state of a non-image area of the recording medium and the adhesion state of the ink to a driven roller 8b after the recording medium contacted the driven roller 8b, which was provided in a discharge portion configured to discharge the recording medium and the surface of which was composed of a polytetrafluoroethylene (PTFE) resin. The criteria of the evaluation of the offset property are as follows.

A: The ink did not adhere to the driven roller 8b, and no image was printed on the non-image area.

B: The ink adhered to the driven roller 8b, but no image was printed on the non-image area.

C: The ink adhered to the driven roller 8b, and an image was printed on the non-image area.

The transporting speed of the recording medium in the ink-jet recording apparatus was set to 846.7 mm/sec. The time required from landing of an ink droplet on the recording medium to arrival of the landing position of the ink droplet at the driven roller 8b was 0.35 seconds. A sheet (IJW, manufactured by Oji Paper Co., Ltd.) was cut into A4 size and used as the recording medium (recording sheet P). The size of the solid image formed on the recording medium was 10×10 cm.

[Evaluation of Image Density]

An image density of each of the inks of Example 1, Example 2, and Comparative Example 1 was evaluated in accordance with the method described below. Table 3 shows evaluation results of the image densities of the inks of Example 1, Example 2, and Comparative Example 1.

<Method for Evaluating Image Density>

The amount of ink ejected from a recording head was controlled to be 11 pL, and a solid image was formed on plain paper (A4, PPC paper). The density of the formed solid image was measured ten times per image with a densitometer (manufactured by GretagMacbeth), and the average of the measured values was defined as the image density. When the image density was 1.0 or more, the sample was evaluated as "good". When the image density was less than 1.0, the sample was evaluated as "no good".

TABLE 3

|  | Example 1 | Example 2 | Comparative Example 1 |
|---|---|---|---|
| Resin | Resin 1 | Resin 1 | Resin 1 |
| The number of carbon atoms of branched-chain alkanediol | 8 | 9 | 7 |
| Contact angle (0.05 seconds) | 48° | 48° | 54° |
| Offset property | A | A | B |
| Image density | 1.1 | 1.1 | 1.2 |
| Evaluation of image density | Good | Good | Good |

Referring to Table 3, it was confirmed that the inks obtained in Examples 1 and 2, in which a pigment dispersion containing a resin having a weight-average molecular weight of 60,000 was used and a branched-chain alkanediol having 8 or 9 carbon atoms was used as a penetrating agent, brought satisfactory results regarding the suppression of generation of an image defect in the formed image due to offset and the image density of the formed image. In contrast, it was confirmed that the ink obtained in Comparative Example 1, in which a pigment dispersion containing a resin having a weight-average molecular weight of 60,000 was used but a branched-chain alkanediol having 7 carbon atoms was used as a penetrating agent, brought an image having a desired image density, that is, an image density equal to or higher than a standard value (image density of 1.0 or more), but somewhat poor performance of suppressing generation of an image defect in the formed image due to offset because the permeability of the ink into paper was low.

Examples 3 to 10 and Comparative Examples 2 to 5

Inks of Examples 3 to 10 and Comparative Examples 2 to 5 were prepared as in Example 1 or 2 except that the content of the branched-chain alkanediol was changed to the contents shown in Tables 4 and 5. For the inks of Examples 3 to 10 and Comparative Examples 2 to 5, the permeability, the offset property, and the image density were evaluated as in Example 1. Tables 4 and 5 show the contact angles (0.05 seconds), evaluation results of the offset property, and evaluation results of the image density of the inks of Examples 3 to 10 and Comparative Examples 2 to 5.

TABLE 4

|  | Comparative Example | | Example | | | |
|---|---|---|---|---|---|---|
|  | 2 | 3 | 3 | 4 | 5 | 6 |
| Resin | Resin 1 | Resin 1 | Resin 1 | Resin 1 | Resin 1 | Resin 1 |
| The number of carbon atoms of branched-chain alkanediol | — | 8 | 8 | 8 | 8 | 8 |
| Content of branched-chain alkanediol (mass %) | 0 | 0.1 | 0.2 | 0.5 | 0.8 | 1.0 |
| Contact angle (0.05 seconds) | 56° | 54° | 49° | 49° | 48° | 45° |
| Offset property | C | B | A | A | A | A |
| Image density | 1.4 | 1.3 | 1.1 | 1.1 | 1.0 | 1.0 |
| Evaluation of image density | Good | Good | Good | Good | Good | Good |

TABLE 5

|  | Comparative Example | | Example | | | |
|---|---|---|---|---|---|---|
|  | 4 | 5 | 7 | 8 | 9 | 10 |
| Resin | Resin 1 | Resin 1 | Resin 1 | Resin 1 | Resin 1 | Resin 1 |
| The number of carbon atoms of branched-chain alkanediol | — | 9 | 9 | 9 | 9 | 9 |
| Content of branched-chain alkanediol (mass %) | 0 | 0.1 | 0.2 | 0.5 | 0.8 | 1.0 |
| Contact angle (0.05 seconds) | 56° | 52° | 49° | 48° | 48° | 45° |

TABLE 5-continued

|  | Comparative Example | | Example | | | |
| --- | --- | --- | --- | --- | --- | --- |
|  | 4 | 5 | 7 | 8 | 9 | 10 |
| Offset property | C | B | A | A | A | A |
| Image density | 1.4 | 1.2 | 1.1 | 1.1 | 1.0 | 1.0 |
| Evaluation of image density | Good | Good | Good | Good | Good | Good |

Referring to Tables 4 and 5, it was confirmed that, in the case where an alkanediol having 8 or 9 carbon atoms was used as the penetrating agent, both the suppression of generation of an image defect in the formed image due to offset and the formation of an image having an image density equal to or higher than a standard value (image density of 1.0 or more) could be achieved by adjusting the content of the alkanediol to be about 0.2% by mass or more relative to the mass of the ink.

Examples 11 to 13

Inks of Examples 11 to 13 containing a branched-chain alkanediol having 9 carbon atoms were prepared as in Example 2 except that the content of the branched-chain alkanediol was changed to the contents shown in Table 6. For the inks of Examples 9 to 13, the permeability and the offset property were evaluated as in Example 1. Furthermore, for the inks of Examples 9 to 13, the image density was evaluated as in Example 1 except that the recording medium was changed from the plain paper (PPC paper) to printing paper having a high ink-jet suitability (IJW 81 g/m$^2$, manufactured by Oji Paper Co., Ltd.). Table 6 shows the contact angles (0.05 seconds), evaluation results of the offset property, and evaluation results of the image density of the inks of Examples 9 to 13.

TABLE 6

|  | Examples | | | | |
| --- | --- | --- | --- | --- | --- |
|  | 9 | 10 | 11 | 12 | 13 |
| Resin | Resin 1 | Resin 1 | Resin 1 | Resin 1 | Resin 1 |
| The number of carbon atoms of branched-chain alkanediol | 9 | 9 | 9 | 9 | 9 |
| Content of branched-chain alkanediol (mass %) | 0.8 | 1.0 | 1.25 | 1.5 | 2.0 |
| Contact angle (0.05 seconds) | 48° | 45° | 41° | 40° | 40° |
| Offset property | A | A | A | A | A |
| Image density | 1.3 | 1.3 | 1.2 | 1.2 | 1.1 |
| Evaluation of image density | Good | Good | Good | Good | Good |

Referring to Tables 4 and 5, with an increase in the amount of alkanediol used, the image density of the formed image tended to decrease. Accordingly, it was believed that if the amount of alkanediol used exceeded about 1.0% by mass, the image density of the formed image would be less than 1.0. However, referring to Table 6, it was confirmed that even when the content of the alkanediol was higher than about 1.0% by mass, both the suppression of generation of an image defect in the formed image due to offset and the formation of an image having an image density equal to or higher than a standard value (image density of 1.0 or more) could be achieved by changing the recording medium from the plain paper (PPC paper) to the printing paper having a high ink-jet suitability (for example, IJW 81 g/m$^2$, manufactured by Oji Paper Co., Ltd.).

Example 14

An ink was prepared as in Example 1 except that the alkanediol was changed from the branched-chain alkanediol having 8 carbon atoms to 1,2-octanediol which is a straight-chain alkanediol having 8 carbon atoms. For the ink of Example 14, the permeability, the offset property, and the image density were evaluated as in Example 1. Table 7 shows the contact angles (0.05 seconds), evaluation results of the offset property, and evaluation results of the image density of the inks of Examples 1 and 14.

TABLE 7

|  | Example | |
| --- | --- | --- |
|  | 1 | 14 |
| Resin | Resin 1 | Resin 1 |
| The number of carbon atoms of alkanediol | 8 | 8 |
| Structure of alkanediol | Branched chain | Straight chain |
| Content of alkanediol (mass %) | 0.5 | 0.5 |
| Contact angle (0.05 seconds) | 48° | 46° |
| Offset property | A | A |
| Image density | 1.1 | 1.1 |
| Evaluation of image density | Good | Good |

Referring to Table 7, it was confirmed that even when the alkanediol had a branched-chain structure or a straight-chain structure, as long as the number of carbon atoms of the alkanediol was 8, an ink, which could suppress generation of an image defect in a formed image due to offset and form an image having an image density equal to or higher than a standard value (image density of 1.0 or more), could be obtained.

Examples 15 to 17 and Comparative Examples 6 and 7

Inks of Examples 15 to 17 and Comparative Examples 6 and 7 were prepared as in Example 2 except that pigment dispersions were prepared by using the styrene-acrylic resins shown in Table 8. For the inks of Examples 15 to 17 and Comparative Examples 6 and 7, the permeability, the offset property, and the image density were evaluated as in Example 1. Table 8 shows the contact angles (0.05 seconds), evaluation results of the offset property, and evaluation results of the image density of the inks of Example 2, Examples 15 to 17, and Comparative Examples 6 and 7.

TABLE 8

|  | Comparative Example 6 | Example 2 | Example 15 | Example 16 | Example 17 | Comparative Example 7 |
|---|---|---|---|---|---|---|
| Resin | Resin 2 | Resin 1 | Resin 3 | Resin 4 | Resin 5 | Resin 6 |
| Weight-average molecular weight of resin | 50,000 | 60,000 | 80,000 | 120,000 | 150,000 | 165,000 |
| The number of carbon atoms of branched-chain alkanediol | 9 | 9 | 9 | 9 | 9 | 9 |
| Content of branched-chain alkanediol (mass %) | 0.5 | 0.5 | 0.5 | 0.5 | 0.5 | 0.5 |
| Contact angle (0.05 seconds) | 48° | 48° | 49° | 48° | 48° | 48° |
| Offset property | A | A | A | A | A | B |
| Image density | 0.9 | 1.1 | 1.1 | 1.1 | 1.1 | 1.2 |
| Evaluation of image density | No Good | Good | Good | Good | Good | Good |

Referring to Table 8, by using the ink of Comparative Example 6, which was prepared using a styrene-acrylic resin having a weight-average molecular weight of less than about 60,000, the image density was lower than the standard value. Thus, it was confirmed that achieving both the suppression of generation of an image defect in the formed image due to offset and the formation of an image having an image density of the standard value or more was difficult. By using the ink of Comparative Example 7, which was prepared using a styrene-acrylic resin having a weight-average molecular weight of more than about 150,000, an image defect in the formed image due to offset was easily generated. Thus, it was confirmed that achieving both the suppression of generation of an image defect in the formed image due to offset and the formation of an image having an image density of the standard value or more (image density of 1.0 or more) was difficult. In contrast, it was confirmed that both the suppression of generation of an image defect in the fainted image due to offset and the formation of an image having an image density of the standard value or more could be achieved, by using the inks of Example 2 and Examples 15 to 17, which were prepared using styrene-acrylic resins having a weight-average molecular weight of about 60,000 or more and about 150,000 or less.

Since the ink of Comparative Example 7 was prepared using a resin having a high molecular weight, the ink has a high viscosity. Accordingly, when a solvent in the ink volatilizes, a further increase in the viscosity occurs. As a result, in addition to the above-described problem, problems of ejection failure of the ink from a nozzle and clogging of the nozzle tend to occur. Therefore, in the case where the ink of Comparative Example 7 is used, it is difficult to form a satisfactory image.

Examples 18 to 20 and Comparative Examples 8 to 13

Inks of Examples 18 to 20 were prepared as in Example 1 except that a pigment dispersion was prepared using Resin 4 instead of Resin 1 and the content of the pigment in each of the inks was changed to the contents shown in Table 9. Inks of Comparative Examples 8 to 10 were prepared as in Comparative Example 1 except that a pigment dispersion was prepared using Resin 4 instead of Resin 1 and the content of the pigment in each of the inks was changed to the contents shown in Table 10. Furthermore, inks of Comparative Examples 11 to 13 were prepared as in Comparative Example 1 except that a pigment dispersion was prepared using Resin 4 instead of Resin 1, the content of the pigment in each of the inks was changed to the contents shown in Table 11, and 1,2-hexanediol, which has 6 carbon atoms, was used as a straight-chain alkanediol. For the inks of Examples 18 to 20 and Comparative Examples 8 to 13, the permeability, the offset property, and the image density were evaluated as in Example 1. Tables 9 to 11 show the contact angles (0.05 seconds), evaluation results of the offset property, and evaluation results of the image density of the inks of Examples 18 to 20 and Comparative Examples 8 to 13.

TABLE 9

|  | Example 18 | Example 19 | Example 20 |
|---|---|---|---|
| Content of pigment (mass %) | 4.0 | 6.0 | 8.0 |
| Resin | Resin 4 | Resin 4 | Resin 4 |
| Weight-average molecular weight of resin | 120,000 | 120,000 | 120,000 |
| The number of carbon atoms of alkanediol | 8 | 8 | 8 |
| Content of alkanediol (mass %) | 0.5 | 0.5 | 0.5 |
| Contact angle (0.05 seconds) | 48° | 48° | 47° |
| Offset property | A | A | A |
| Image density | 1.0 | 1.1 | 1.1 |
| Evaluation of image density | Good | Good | Good |

TABLE 10

|  | Comparative Example 8 | Comparative Example 9 | Comparative Example 10 |
|---|---|---|---|
| Content of pigment (mass %) | 4.0 | 6.0 | 8.0 |
| Resin | Resin 4 | Resin 4 | Resin 4 |
| Weight-average molecular weight of resin | 120,000 | 120,000 | 120,000 |
| The number of carbon atoms of alkanediol | 7 | 7 | 7 |
| Content of alkanediol (mass %) | 0.5 | 0.5 | 0.5 |
| Contact angle (0.05 seconds) | 52° | 51° | 51° |
| Offset property | B | B | C |
| Image density | 1.0 | 1.2 | 1.3 |

TABLE 10-continued

| | Comparative Example | | |
|---|---|---|---|
| | 8 | 9 | 10 |
| Evaluation of image density | Good | Good | Good |

TABLE 11

| | Comparative Example | | |
|---|---|---|---|
| | 11 | 12 | 13 |
| Content of pigment (mass %) | 4.0 | 6.0 | 8.0 |
| Resin | Resin 4 | Resin 4 | Resin 4 |
| Weight-average molecular weight of resin | 120,000 | 120,000 | 120,000 |
| The number of carbon atoms of alkanediol | 6 | 6 | 6 |
| Content of alkanediol (mass %) | 0.5 | 0.5 | 0.5 |
| Contact angle (0.05 seconds) | 54° | 53° | 53° |
| Offset property | B | C | C |
| Image density | 1.2 | 1.3 | 1.3 |
| Evaluation of image density | Good | Good | Good |

In general, in the case where the pigment concentration in an ink is increased, with an increase in the solid content in the ink, the ink does not easily permeate into a recording medium and an image defect in a formed image due to offset tends to be generated. However, referring to Tables 9 to 11, it was confirmed that generation of an image defect in the formed image due to offset could be suppressed even when a large amount of the pigment, i.e., 8.0% by mass of the pigment was incorporated, by using the inks of Examples 18 to 20, which were prepared using an alkanediol having 8 carbon atoms. In contrast, it was confirmed that generation of an image defect in the formed image due to offset was not easily suppressed even when the content of the pigment was about 4.0% by mass, by using the inks of Comparative Examples 8 to 13, which were prepared using an alkanediol having 7 or less carbon atoms.

As is apparent from Examples described above, according to some embodiments of the present disclosure, by preparing an ink using an alkanediol having 8 or 9 carbon atoms, the content of a pigment in the ink can be increased, and an image having an image density equal to or higher than a standard value (image density of 1.0 or more) can be formed while reducing the amount of ink ejected from a head. In accordance with some embodiments of the present disclosure, since the amount of ink ejected can be decreased as described above, generation of an image defect in a formed image due to offset can be more easily suppressed by increasing the content of the pigment in the ink.

Examples 21 to 29

Preparation of Yellow Pigment Dispersion

A pigment P.Y-74 was used as a yellow pigment. To a Nano Grain Mill (manufactured by Asada Iron Works Co., Ltd.), 15% by mass of the pigment, 6% by mass of a styrene-acrylic resin (Resin 4), and 0.5% by mass of a surfactant (Olfine E1010, ethylene oxide adduct of acetylene diol, manufactured by Nissin Chemical Industry Co., Ltd.) relative to the total mass of materials used in the preparation of a pigment dispersion, water, and potassium hydroxide in an amount necessary for neutralizing the styrene-acrylic resin were charged. Zirconia beads having a bead diameter of 0.5 mm were charged as media in the Nano Grain Mill. The pigment and the styrene-acrylic resin were kneaded while being subjected to water cooling to prepare a pigment dispersion. The prepared pigment dispersion was diluted by 300-fold with ion-exchange water. The volume-average particle diameter D50 of the pigment in the diluted pigment dispersion was measured with a dynamic light scattering particle size distribution analyzer (Zetasizer Nano, manufactured by Sysmex Corporation). It was confirmed that the volume-average particle diameter of the pigment was within a range of about 70 nm or more and about 130 nm or less.

(Preparation of Magenta Pigment Dispersion)

A pigment P.R-122 was used as a magenta pigment. To a Nano Grain Mill (manufactured by Asada Iron Works Co., Ltd.), 15% by mass of the pigment, 6% by mass of a styrene-acrylic resin (Resin 4), and 0.5% by mass of a surfactant (Olfine E1010, ethylene oxide adduct of acetylene diol, manufactured by Nissin Chemical Industry Co., Ltd.) relative to the total mass of materials used in the preparation of a pigment dispersion, water, and potassium hydroxide in an amount necessary for neutralizing the styrene-acrylic resin were charged. Zirconia beads having a bead diameter of 0.5 mm were charged as media in the Nano Grain Mill. The pigment and the styrene-acrylic resin were kneaded while being subjected to water cooling to prepare a pigment dispersion. The prepared pigment dispersion was diluted by 300-fold with ion-exchange water. The volume-average particle diameter D50 of the pigment in the diluted pigment dispersion was measured with a dynamic light scattering particle size distribution analyzer (Zetasizer Nano, manufactured by Sysmex Corporation). It was confirmed that the volume-average particle diameter of the pigment was within a range of about 70 nm or more and about 130 nm or less.

(Preparation of Black Pigment Dispersion)

A pigment P.Bk-7 was used as a black pigment. To a Nano Grain Mill (manufactured by Asada Iron Works Co., Ltd.), 15% by mass of the pigment, 6% by mass of a styrene-acrylic resin (Resin 4), and 0.5% by mass of a surfactant (Olfine E1010, ethylene oxide adduct of acetylene diol, manufactured by Nissin Chemical Industry Co., Ltd.) relative to the total mass of materials used in the preparation of a pigment dispersion, water, and potassium hydroxide in an amount necessary for neutralizing the styrene-acrylic resin were charged. Zirconia beads having a bead diameter of 0.5 mm were charged as media in the Nano Grain Mill. The pigment and the styrene-acrylic resin were kneaded while being subjected to water cooling to prepare a pigment dispersion. The prepared pigment dispersion was diluted by 300-fold with ion-exchange water. The volume-average particle diameter D50 of the pigment in the diluted pigment dispersion was measured with a dynamic light scattering particle size distribution analyzer (Zetasizer Nano, manufactured by Sysmex Corporation). It was confirmed that the volume-average particle diameter of the pigment was within a range of about 70 nm or more and about 130 nm or less.

Inks of Examples 21 to 29 were prepared as in Example 1 except that the yellow pigment dispersion, the magenta pigment dispersion, or the black pigment dispersion was used as the pigment dispersion, and the content of the pigment in each of the inks was changed to the contents shown in Tables 12 to 14. For the inks of Examples 21 to 29, the offset property and the image density were evaluated as in Example 1. Tables 12 to 14 show evaluation results of the offset property and evaluation results of the image density of the inks of Examples 21 to 29.

TABLE 12

|  | Example | | |
| --- | --- | --- | --- |
|  | 21 | 22 | 23 |
| Type of pigment | P.Y-74 | P.Y-74 | P.Y-74 |
| Content of pigment (mass %) | 4.0 | 6.0 | 8.0 |
| Resin | Resin 4 | Resin 4 | Resin 4 |
| Weight-average molecular weight of resin | 120,000 | 120,000 | 120,000 |
| The number of carbon atoms of alkanediol | 8 | 8 | 8 |
| Content of branched-chain alkanediol (mass %) | 0.5 | 0.5 | 0.5 |
| Offset property | A | A | A |
| Image density | 1.0 | 1.1 | 1.2 |
| Evaluation of image density | Good | Good | Good |

TABLE 13

|  | Example | | |
| --- | --- | --- | --- |
|  | 24 | 25 | 26 |
| Type of pigment | P.R-122 | P.R-122 | P.R-122 |
| Content of pigment (mass %) | 4.0 | 6.0 | 8.0 |
| Resin | Resin 4 | Resin 4 | Resin 4 |
| Weight-average molecular weight of resin | 120,000 | 120,000 | 120,000 |
| The number of carbon atoms of alkanediol | 8 | 8 | 8 |
| Content of branched-chain alkanediol (mass %) | 0.5 | 0.5 | 0.5 |
| Offset property | A | A | A |
| Image density | 1.0 | 1.0 | 1.0 |
| Evaluation of image density | Good | Good | Good |

TABLE 14

|  | Example | | |
| --- | --- | --- | --- |
|  | 27 | 28 | 29 |
| Type of pigment | P.Bk-7 | P.Bk-7 | P.Bk-7 |
| Content of pigment (mass %) | 4.0 | 6.0 | 8.0 |
| Resin | Resin 4 | Resin 4 | Resin 4 |
| Weight-average molecular weight of resin | 120,000 | 120,000 | 120,000 |
| The number of carbon atoms of alkanediol | 8 | 8 | 8 |
| Content of branched-chain alkanediol (mass %) | 0.5 | 0.5 | 0.5 |
| Offset property | A | A | A |
| Image density | 1.0 | 1.0 | 1.0 |
| Evaluation of image density | Good | Good | Good |

Referring to Tables 12 to 14, according to the ink of some embodiments of the present disclosure, regardless of the type of pigment, it was confirmed that suppression of generation of an image defect in a formed image due to offset and forming an image having an image density equal to or higher than a standard value (image density of 1.0 or more) were possible even when the pigment was incorporated at a high concentration of about 8.0% by mass, as in the inks of Examples 18 to 20 shown in Table 9.

Having thus described in detail embodiments of the present disclosure, it is to be understood that the subject matter disclosed by the foregoing paragraphs is not to be limited to particular details and/or embodiments set forth in the above description. For example, particular numerical values or ranges are provided by way of illustration for clarity of exposition, and are not intended to limit the possible values or ranges that may be implemented in accordance with the present disclosure. Additionally, the present disclosure may be practiced without necessarily providing one or more of the advantages described herein or otherwise understood in view of the disclosure and/or that may be realized in some embodiments thereof. Accordingly, it is understood that many variations of the embodiments and subject matter disclosed herein are possible without departing from the scope of the present disclosure.

What is claimed is:

1. An ink for an ink jet recording apparatus, comprising:
    water;
    a pigment dispersion; and
    a penetrating agent,
    wherein the pigment dispersion contains a resin having a weight-average molecular weight of about 60,000 or more and about 150,000 or less and a pigment,
    the penetrating agent contains an alkanediol having 8 or 9 carbon atoms, the alkanediol is at least one selected from the group consisting of 2-ethyl-1,3-hexanediol and 1,2-octanediol, and
    the content of the alkanediol is more than about 0.2% and less than about 1% by mass relative to the total mass of the ink.

2. The ink according to claim 1, wherein the content of the pigment is about 4% by mass or more and about 8% by mass or less relative to the total mass of the ink.

3. The ink according to claim 1, further comprising:
    as another penetrating agent, at least one selected from the group consisting of alkanediols having 7 or less carbon atoms, alkylene glycol monoalkyl ethers, dialkylene glycol monoalkyl ethers, trialkylene glycol monoalkyl ethers, and cyclic ketone compounds.

4. The ink according to claim 3, wherein the another penetrating agent used in combination with the alkanediol having 8 or 9 carbon atoms includes at least one of the trialkylene glycol monoalkyl ethers.

5. The ink according to claim 4, wherein the at least one of the trialkylene glycol monoalkyl ethers is triethylene glycol monobutyl ether.

6. The ink according to claim 1, further comprising a dissolution stabilizer selected from the group consisting of 2-pyrrolidone and N-methyl-2-pyrrolidone, the dissolution stabilizer being more than about 5% and less than about 15% by mass relative to the total mass of the ink.

7. The ink according to claim 6, further comprising glycerol of more than about 10% and less than about 25% by mass relative to the total mass of the ink.

* * * * *